US005627740A

United States Patent [19]
Johari

[11] Patent Number: 5,627,740
[45] Date of Patent: May 6, 1997

[54] LOW DISSIPATION CURRENT SENSING SYSTEM FOR A SWITCHED DC POWER SUPPLY

[75] Inventor: Girish C. Johari, Round Rock, Tex.

[73] Assignee: International Business Machines Corporation, Armonk, N.Y.

[21] Appl. No.: 355,869

[22] Filed: Dec. 14, 1994

[51] Int. Cl.[6] ............................................. H02M 5/42
[52] U.S. Cl. ........................ 363/78; 323/287; 363/21; 363/89
[58] Field of Search ..................... 363/21, 86, 76, 363/78, 89; 323/353, 287, 293

[56] References Cited

U.S. PATENT DOCUMENTS

| 4,058,758 | 11/1977 | Peterson | 363/80 |
|---|---|---|---|
| 4,511,829 | 4/1985 | Wisneiwski | 318/317 |
| 5,233,287 | 8/1993 | Lenk | 323/268 |

*Primary Examiner*—Peter S. Wong
*Assistant Examiner*—Shawn Riley
*Attorney, Agent, or Firm*—Casimer K. Salys

[57] ABSTRACT

A system and method for measuring the load current in a power supply driven by switched transformer or the like. Rectified rectangular waveform input voltage pulses are interrupted to exhibit a less than 100 percent duty cycle with an off state value approaching zero volts. A filtering inductor is situated in normal manner between the input voltage pulses and the load. Preferably, a capacitor is connected across the load. A freewheeling diode and sensing resistor are connected across the less than 100 percent duty cycle rectangular input voltage. The peak values of the current pulses through the sensing resistor have been determined to be related to the load current of the power supply. The voltage drop across the resistor is amplified, detected and used to regulate the magnitude of the limited duty cycle input voltage. The voltage drop across the resistor may be used to limit the power supply output current or to balance current in parallel configurations of multiple power supplies. The placement of the sensing resistor in the path of the freewheeling diode allows load current measurement with minimum power dissipation.

9 Claims, 4 Drawing Sheets

LOW DISSIPATION CURRENT SENSING SYSTEM FOR A SWITCHED DC POWER SUPPLY

FIELD OF THE INVENTION

The present invention relates generally to power supplies. More particularly, the invention is directed to the measurement of load current on the output side of a switched power supply.

BACKGROUND OF THE INVENTION

Direct current (DC) power supplies and DC/DC converters are often connected to have the outputs operate in parallel. This can occur in a case where a system is being upgraded, e.g. to supplement the needs of an existing power supply, or in an initial design environment which allows a purchaser of a system, such as a computer system, to custom configure the system capacity in terms of processor count. For example, the latter situation is common for new parallel processor systems, where customers often have the ability to choose within the same product line anywhere from one processor to hundreds of processors. Rather than redesign the power supply for each variation, the preference is to parallel the outputs of the plural power supplies as the processor count dictates.

Given that the voltages of the parallel connected power supplies will not match perfectly, there is a need for output current sensing and related control to ensure that the current outputs are balances among the power supplies. Output current sensing is also required as a part of the current limiting protection integral to such power supplies. Thus, whether one or multiple parallel connected power supplies are used, load or output current sensing is a necessary aspect of contemporary power supply designs.

The type of circuit utilized for sensing the DC output current from power supplies is an important aspect of the cost and power dissipation. The importance increases as the number of power supplies and output current grow. Also, the trend toward lower power dissipation hardware as motivated by environmental issues also drives the need for lower power dissipation designs.

Current sensing in a power supplies can be achieved in many different ways. In power supplies using transformers with both primary and secondary sides, current sensing can be achieved on the primary side using either a sensing resistor or a current transformer. However, sensing of a secondary load current by measurements performed on the primary side introduces inaccuracies due to the presence of magnetizing current within the transformer. Sensing of the power going to the primary side of the transformer using a resistor does, however, reduce the power dissipation. The current transformer approach suffers not only from the magnetizing current error, but from the relatively high cost of the components for this configuration. Therefore, the preference is to sense output or load current flow on the secondary or load side of transformer configured power supplies.

The sensing and related control of the load current on the output side of the power supply is conventionally done using either a Hall effect device or with a shunt resistor in path of the output current. The Hall effect device tends to be relatively expensive. Though shunt resistors can be expensive if tight tolerances are required, the prevailing problem with such devices is the relatively high power dissipation associated with their presence in the DC load current path.

Therefore, there exists a need for a system and method which provides an accurate measure of power supply output or load current as measured on the secondary side which is relatively low in cost, and which has minimal power dissipation.

SUMMARY OF THE INVENTION

The present invention involves a low power dissipation load current measuring apparatus comprising, means for generating substantially rectangular voltage pulses of less than 100 percent duty cycle, an inductive means serially connected between the means for generating and a load, a freewheeling diode means connected in parallel with the means for generating, and means for relating current pulses through the freewheeling diode means to current drawn by the load. In another form, the invention relates to the aforementioned load current measuring apparatus combined with a means for regulating the magnitude of the voltage pulses responsive to the magnitude of the current pulses through the freewheeling diode means. In other forms, the invention relates to methods characterizing the apparatus defined hereinbefore.

According to one practice of the invention, a DC/DC converter, or other switching means, generates a succession of rectangular voltage pulses of less than 100 percent of duty cycle through diode or other rectifying devices. The voltage pulses are furnished to one side of an inductor situated in the path between such voltage pulse source and the output node of the power supply. Preferably, the output node is capacitively filtered. A freewheeling diode or analogous rectifying devices is connected in parallel with the rectangular voltage pulses. The invention includes the addition of a resistor of relatively low value in the path of the current through the freewheeling diode.

The voltage drop across the resistor corresponds to the current flow through the freewheeling diode. The switching of the rectangular voltage pulses creates low duty cycle current pulses through the freewheeling diode. The peak values of the current pulses are directly related to the output or load current. Thereby, measurement of the voltage drop across the resistor provides a direct measure of the output or load current. However, since the current pulses through the freewheeling diode are of very low duty cycle, the power dissipation in the resistor is also very low. This is in contrast to a conventional current sensing shunt resistor configuration in which the shunt resistor power is directly proportional to 100 percent of the current flowing through the load.

The output current sensed according to the present invention can be used to control or limit the individual power supply or can be used to balance the contributions multiple parallel connected power supplies.

These and other features of the invention will become apparent upon considering the detailed embodiment described hereinafter.

DESCRIPTION OF THE PREFERRED EMBODIMENT

Figure 1:
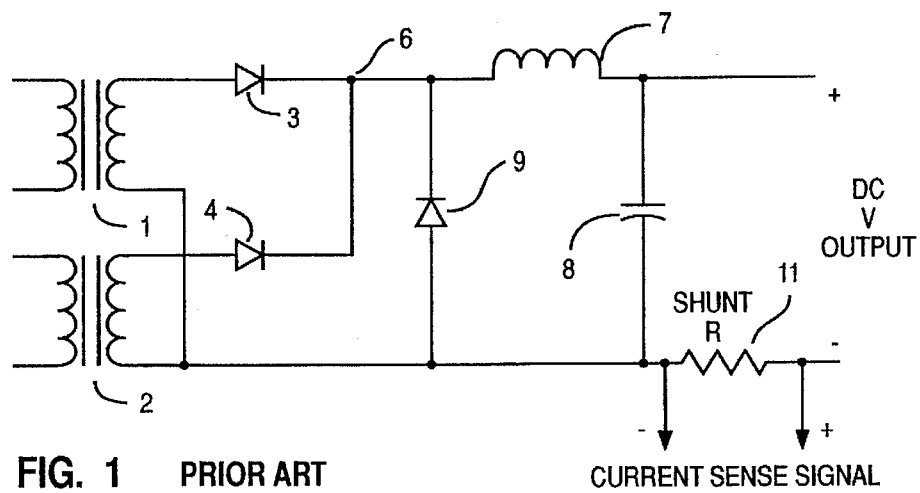
FIG. 1 is a schematic circuit depicting a prior art shunt resistor current sensing power supply configuration.

FIG. 1 depicts the fundamental elements of a prior art power supply with load current sensing capability. Transformers 1 and 2 are driven on the primary side by complementing rectangular voltage pulses. The output voltage from the secondary side after rectification by diodes 3 and 4, as appears on node 6, is substantially constant or of sufficiently low ripple voltage that it can be filtered by inductor 7 and capacitor 8. Obviously, additional filtering and voltage regulation can be introduced after capacitor 8 if the need exists. Rectifying diode 9 suppresses voltage spikes which are produced by inductor 7 in response to switching or other transient effects on the primary side. Shunt resistor 11 measures the output current to the load, and is thereby suitable for current limiting regulation within the power supply or for current balancing among multiple parallel connected power supplies.

The problem with using a shunt resistor to measure load current lies with the power dissipation introduced by such resistor. Since the shunt resistor is in the load current path, the resistor dissipates power at 100 percent of the duty cycle of the current flowing to the load. Though the impedance of the shunt resistor must be low in relation to the impedance of the load, it must still be of sufficient value to provide a measurable voltage drop. As the current to the load increases, the power dissipation increases in proportion to the square of the current while the voltage drop for measurement purposes grows only linearly with the current flow. Not only is the power dissipation itself a problem, but as the power dissipation increases the design of the shunt resistor is complicated by the need for resistance stability over the potential range of the power and temperature. This increases the price of the shunt resistor.

The present invention reduces the effective duty cycle of the current sent through a resistor used to sense output current flow. Thereby, not only is the power dissipation decreased, but the temperature constraints needed of the sensing resistor are also minimized.

Figure 2:
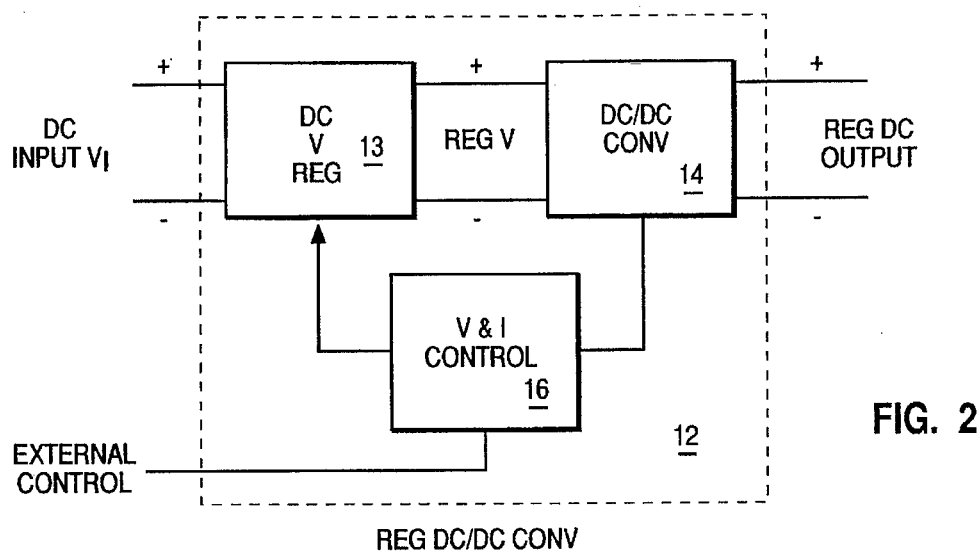
FIG. 2 is a schematic diagram of a regulated power supply.

FIG. 2 schematically depicts a preferred application or the present invention. Power supply 12 preferably includes a DC voltage regulator 13 and DC/DC converter 14, converter 14 typically being a free running low impedance transistor driven transformer design. As shown, power supply 12 also includes a feedback configured voltage and current control 16. In normal operation, a DC input voltage $V_I$ is provided to regulator 13. The regulated voltage V is furnished to DC/DC converter 14. Converter 14 uses a transformer to reduce the voltage at the power supply output. When the output voltage or current are not consistent with the desired output levels, voltage and current control 16 adjusts regulator 13 accordingly. Note that control 16 also provides a means by which external control signals can be imposed upon power supply 12.

Figure 3:
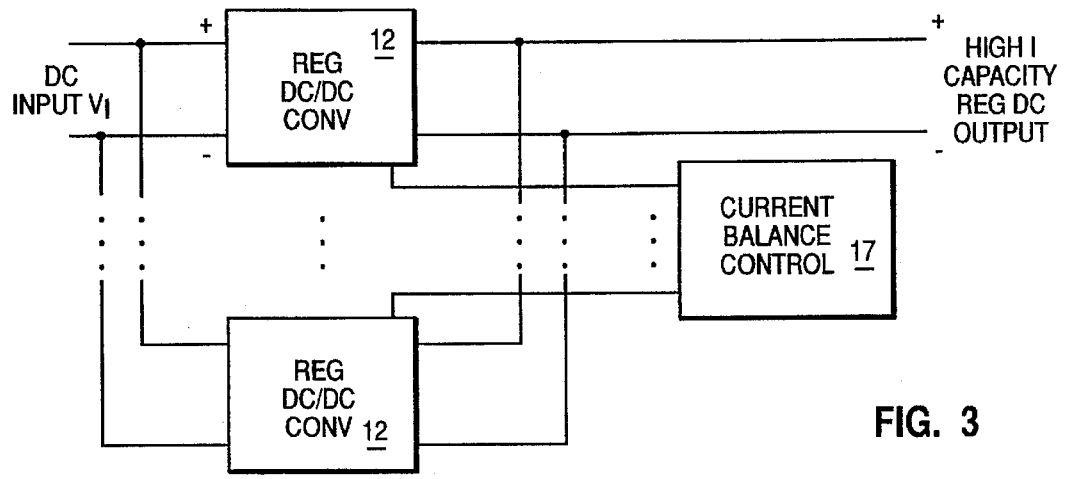
FIG. 3 is a schematic diagram of parallel interconnected regulated power supplies.

FIG. 3 depicts the parallel connection of multiple power supplies 12 to provide a unified high current capacity regulated DC output. Current balance control 17 is connected to various of the power supplies 12 to balance the current outputs from the individual power supplies. This avoids small voltage tolerance differences from causing materially unbalanced currents from the supplies, or if so desired, an intentional current allocation among the power supplies.

Figure 4:
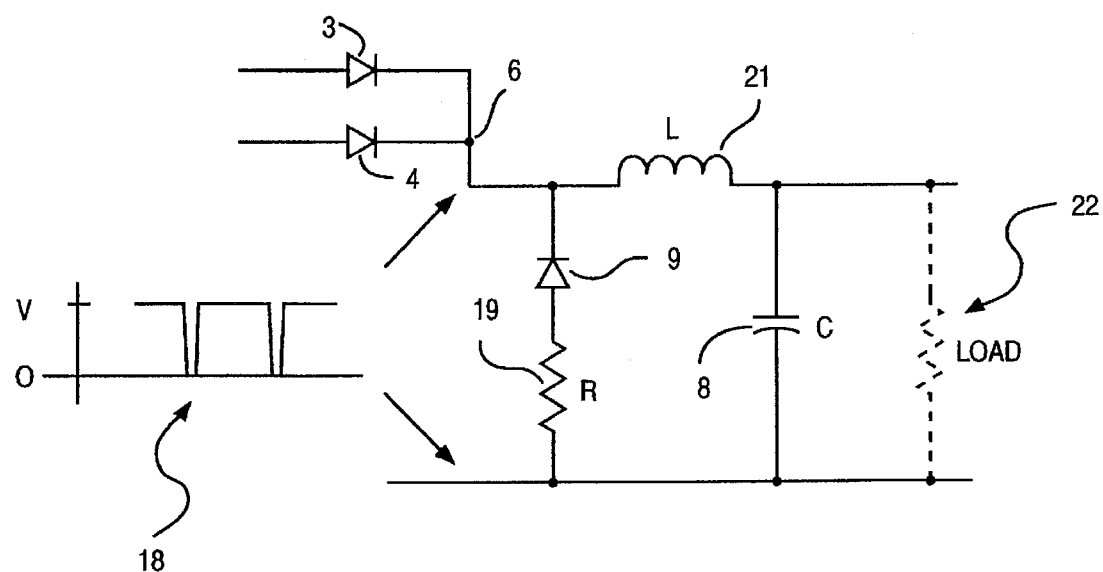
FIG. 4 is a schematic depicting the basic elements of an invention embodiment.

FIG. 4 depicts the key elements which characterize the present invention. These elements are situated on the secondary side of the transformer system within DC/DC converter 14. An example of an efficiently designed transformer system suitable for the DC/DC converter function is described in IBM Technical Disclosure Bulletin, Volume 37, No. 9, September 1994 on pp. 671–673, the subject matter of which is incorporated by reference herein. Though a transistor switched transformer of the form in the aforementioned technical disclosure bulletin is the typical and preferred form of practicing the invention, there may be other means for generating the rectangular input voltage pulses, generally at 18 in FIG. 4, which allow implementation of the invention.

Note that diodes 3, 4 and 9, and node 6, are analogous to elements in the prior art, as appears in FIG. 1. Filter inductor 21 and filter capacitor 8 are also typical of what appears in the prior art.

With the provision of rectangular input pulses 18 as shown in FIG. 4, the present invention places the current sensing resistor 19 in the current path of freewheeling diode 9. Since the current through inductor 21 matches the current directed to the load during those intervals when the rectangular voltage wave form is stable at value V, each abrupt drop in the voltage to a zero level causes a brief current pulse through diode 9 and resistor 19 which corresponds to the immediately preceding level of load current. The momentary continuity of the current through inductor 21 following the drop of the input voltage to 0 is ensured by the parallel presence of the load at 22 and power supply filter capacitor 8.

The waveform of the current through sensing resistor 19 and diode 9 is in the form of pulses. The duration of each pulse is relatively coincident with the low state of the input voltage as affected by the value of inductor 21. Therefore, though the peak value of the current through sensing resistor 19 matches the load current, the duty cycle of that current is materially shorter. The power dissipated by resistor 19 is therefore also materially less.

Figure 5:
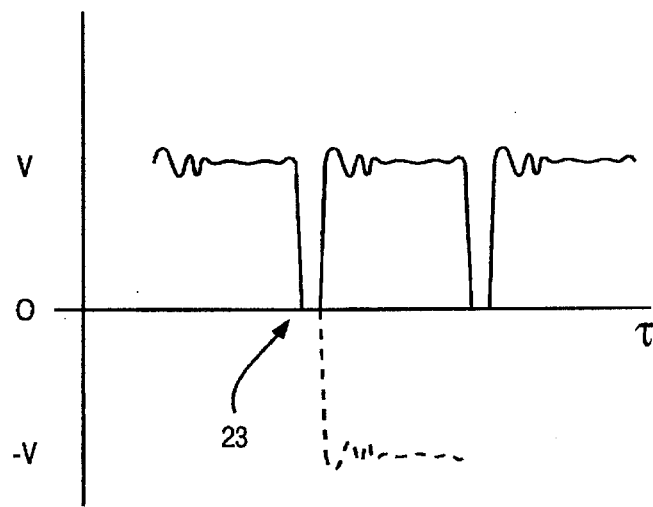
FIG. 5 is a diagram relating to the character of the less than 100 percent duty cycle rectangular voltage pulses.

FIG. 5 depicts a rectangular waveform analogous to that at 18 in FIG. 4. The waveform in FIG. 5 characterizes the desired input as would typically be contaminated by ringing effects and slope in the rising and falling edges. Diodes 3 and 4 rectify the transformer output voltage when both positive and negative excursions result, as is common of push-pull transistor driven converters. Accurate measurement of the load current using resistor 19 requires that the falling edge of the rectangular waveform reach or approach zero volts, and that the rate of change of the voltage (DV/DT) be materially greater than the rate of decay characterizing the combination of inductor 21, capacitor 8, resistive load 22 and sensing resistor 19. Converters of the class described earlier satisfy such constraint when appropriately driven as described with reference to FIG. 6. Free running push-pull converters typically satisfy the zero requirement as a consequence of dead zones such as 23 resulting from transistor diode drops and gate thresholds.

Figure 6:
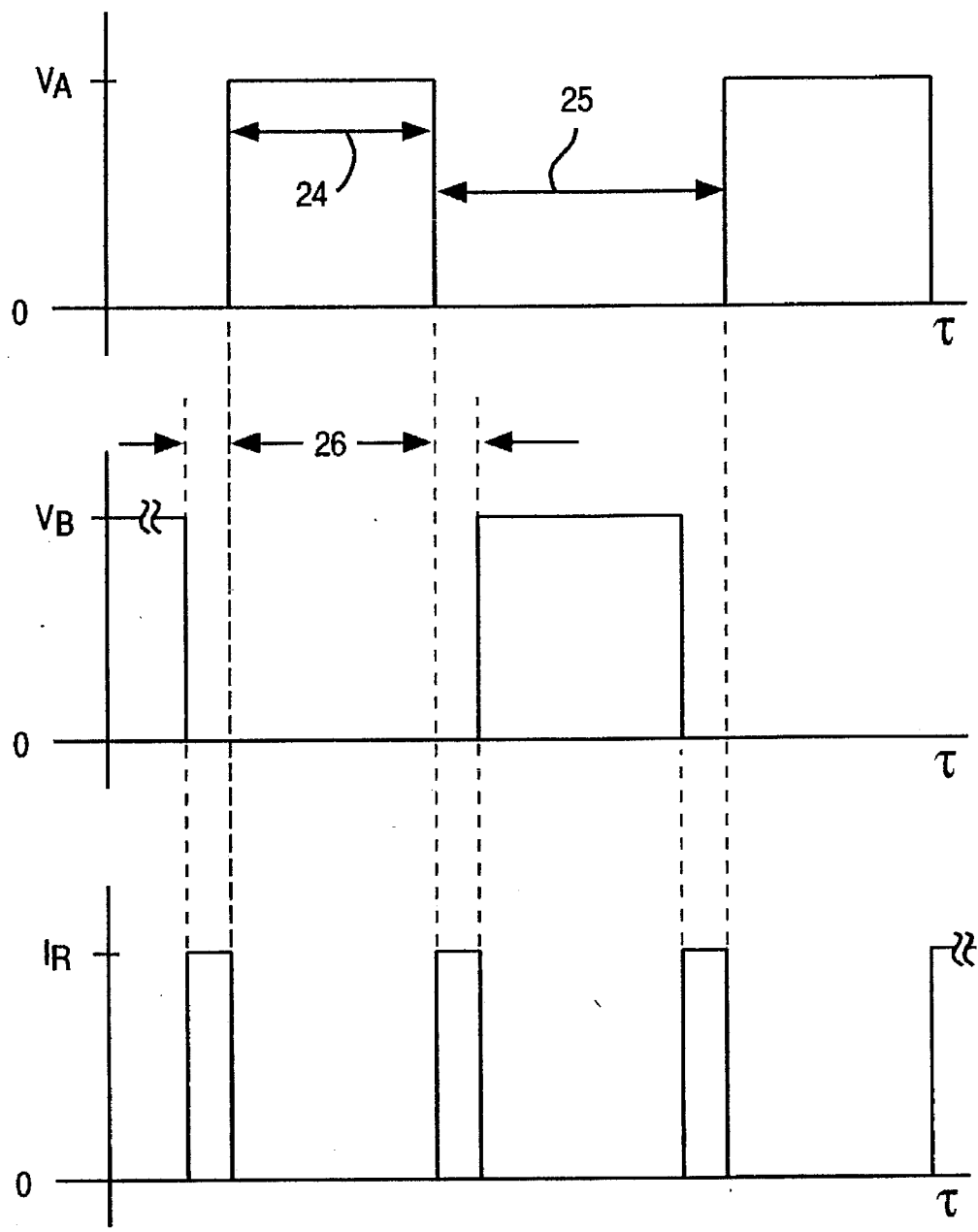
FIG. 6 is a diagram relating to one aspect of the less than 100 percent duty cycle rectangular voltage pulses.
Figure 7:
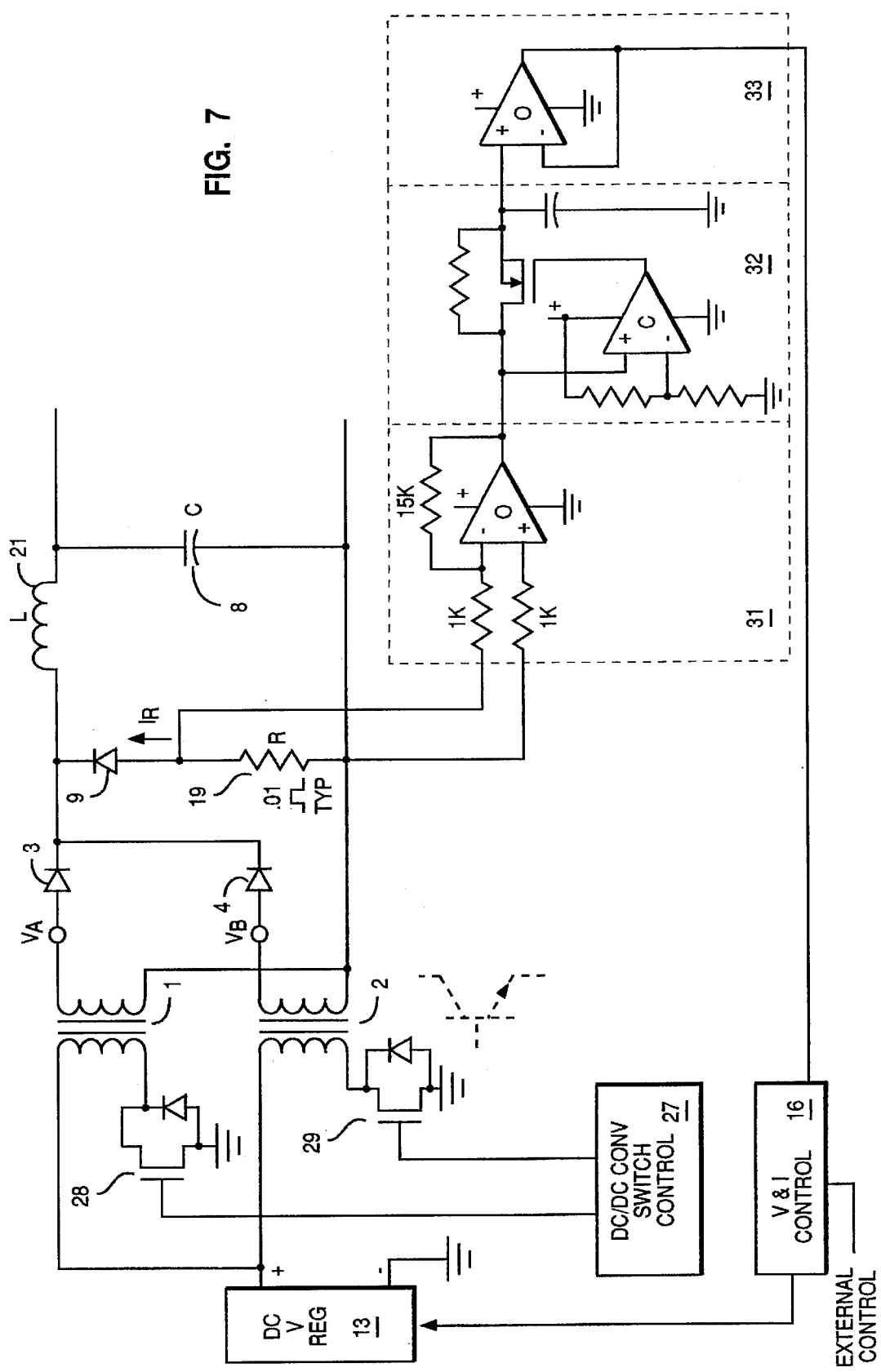
FIG. 7 is a schematic illustrating the use of the present invention current sensing system to regulate the output of a power supply.

FIG. 6 depicts preferred waveforms as used in FIG. 7 to accomplish the present invention. Note that the duty cycle of each voltage $V_A$ and $V_B$ is slightly less than 50 percent. Namely, the time interval 24 is slightly less than the time interval 25. The outcomes are the aforementioned zero voltage intervals at 26 and the time associated current flow through the current sensing resistor 19. Preferably, the duty cycle of the current pulse $I_R$ is 5 percent or less. The end result is that the power dissipation is reduced proportionately over the prior art shunt located current sensing resistor configuration.

Further details of a preferred embodiment of the present invention appear in FIG. 7. DC/DC converter switch control 27 generates a succession of rectangular voltage signals suitable to drive field effect transistors 28 and 29. In the alternative, the transistors could be bipolar devices. The timing of the drive signals follows the format depicted in FIG. 6, wherein the two drive signals are not overlapping waveforms suitable to produce a set of voltages $V_A$ and $V_B$ having a duty cycle which is less than 100 percent. As noted earlier, the preferred minimum duty cycles is somewhat greater than 95 percent. As implemented in FIG. 7, the current pulses generated across sensing resistor 19 produce voltage drop pulses which are amplified by device 31, are subject to a peak value sample and hold by element 32, and are provided as a output to voltage and current control 16 by voltage follower element 33. DC voltage regulator 13 adjusts the voltage supplied to transformers 1 and 2 as necessary to meet the specified current limits or current balancing values defined by voltage and current control 16.

The invention is particularly important in that constraining the duty cycle of the current flow through the sensing resistor to 5 percent or less of that exhibited by the shunt configuration of the prior art, reduces the power wasted and the size of the associated resistor device while providing an easy way to limit power supply currents or balance parallel connected power supplies.

Though the invention has been described and illustrated by way of a specific embodiment, the systems and methods encompassed by the invention should be interpreted to be in keeping with the breadth of the claims set forth hereinafter.

I claim:

1. A power supply with current control, comprising:

a source of adjustable DC voltage;

means for generating substantially rectangular voltage pulses, the pulses having an amplitude proportional to the adjustable DC voltage and a constant duty cycle of less than 100 percent;

an inductive means serially connected between the means for generating and a load;

a freewheeling diode means connecting in parallel with a means for generating;

means for relating current pulses through the freewheeling diode means to current drawn by the load; and means for regulating the magnitude of the adjustable DC voltage responsive to the magnitude of the current pulses through the freewheeling diode means in controlling the current drawn by the load.

2. The apparatus recited in claim 1, wherein the means for relating current pulses detects the peaks of the current pulses.

3. The apparatus recited in claim 2, wherein the means for relating current pulses detects current by measuring the voltage drop across a resistor situated in the path of the current through the freewheeling diode means.

4. The apparatus recited in claim 3, further comprising a capacitor means connected in parallel with the load.

5. A method of controlling the current from a power supply, comprising the steps of:

generating DC voltage in an adjustable supply;

generating substantially rectangular voltage pulses, the pulses having an amplitude proportional to the adjustable DC voltage and a constant duty cycle of less than 100 percent;

supplying current through an inductor which is serially connected between the generated substantially rectangular voltage pulses and a load;

relating current pulses through a freewheeling diode, which is connected in parallel with the generated substantially rectangular voltage pulses, to current drawn by the loads; and regulating the magnitude of the adjustable DC voltage responsive to the magnitude of the current pulses through the freewheeling diode in controlling the current drawn by the load.

6. The method recited in claim 5, wherein the relating step detects the peaks of the current pulses.

7. The method recited in claim 6, wherein the relating step detects current by measuring the voltage drop across a resistor situated in the path of the current through the freewheeling diode.

8. The method recited in claim 7, wherein a capacitor is connected in parallel with the load.

9. The method recited in claim 5, wherein the step of generating substantially rectangular voltage pulses is accomplished by rectifying an output of a switched transformer.

* * * * *